US008629827B2

(12) United States Patent
Lee et al.

(10) Patent No.: US 8,629,827 B2

(45) Date of Patent: Jan. 14, 2014

(54) DISPLAY DEVICE AND METHOD OF MANUFACTURING THE SAME

(75) Inventors: Jae-Hoon Lee, Seoul (KR); Yong-Soon Lee, Cheonan-si (KR); Young-Su Kim, Daegu (KR); Yu-Han Bae, Seoul (KR)

(73) Assignee: Samsung Display Co., Ltd. (KR)

(*) Notice: Subject to any disclaimer, the term of this patent is extended or adjusted under 35 U.S.C. 154(b) by 878 days.

(21) Appl. No.: 12/762,470

(22) Filed: Apr. 19, 2010

(65) Prior Publication Data

US 2010/0265238 A1 Oct. 21, 2010

(30) Foreign Application Priority Data

Apr. 20, 2009 (KR) ........................ 10-2009-0034078

(51) Int. Cl.

*G06F 3/038* (2013.01)
*H01J 9/00* (2006.01)

(52) U.S. Cl.

USPC ............... 345/100; 345/87; 345/88; 345/103; 345/204; 345/211; 349/89; 349/143; 349/149

(58) Field of Classification Search

USPC ......... 345/87, 98, 104, 103, 211, 55, 88, 100, 345/204; 365/185.22; 349/84, 149, 143, 349/42–43, 48–49; 445/24; 315/169.3

See application file for complete search history.

(56) References Cited

U.S. PATENT DOCUMENTS

| | | | | |
|---|---|---|---|---|
| 2006/0120160 A1* | 6/2006 | Park et al. | ................ | 365/185.22 |
| 2006/0164350 A1* | 7/2006 | Kim et al. | ....................... | 345/87 |
| 2007/0097072 A1* | 5/2007 | Kim et al. | ..................... | 345/103 |

FOREIGN PATENT DOCUMENTS

| | | | |
|---|---|---|---|
| CN | 1648986 | A | 8/2005 |
| CN | 1746757 | A | 3/2006 |
| CN | 1755444 | A | 4/2006 |
| CN | 1808250 | A | 7/2006 |
| CN | 1959480 | A | 5/2007 |
| CN | 101149909 | A | 3/2008 |
| JP | 11352938 | A | 12/1999 |
| JP | 2004004875 | A | 1/2004 |
| JP | 2006079104 | A | 3/2006 |
| JP | 2006178461 | A | 7/2006 |
| JP | 2007128092 | A | 5/2007 |
| KR | 1020060029352 | A | 4/2006 |
| KR | 1020080044397 | A | 5/2008 |
| KR | 1020080047882 | A | 5/2008 |

* cited by examiner

*Primary Examiner* — Lun-Yi Lao
*Assistant Examiner* — Md Saiful A Siddiqui
(74) *Attorney, Agent, or Firm* — Cantor Colburn LLP

(57) ABSTRACT

A display device includes a display panel, a data driving part and a gate driving part. The display panel includes a first pixel row. The first pixel row includes a first pixel connected to an (n+1)-th gate line and an (m+1)-th data line (where 'n' and 'm' are natural numbers), and a second pixel connected to an n-th gate line and an (m+2)-th data line. The data driving part applies a data voltage having a first polarity with respect to a reference voltage to the (m+1)-th data line, and applies a data voltage having a second polarity with respect to the reference voltage to the (m+2)-th data line. The gate driving part sequentially applies a gate signal to the n-th gate line and the (n+1)-th gate line.

17 Claims, 10 Drawing Sheets

100

DISPLAY DEVICE AND METHOD OF MANUFACTURING THE SAME

This application claims priority to Korean Patent Application No. 2009-34078, filed on Apr. 20, 2009, and all the benefits accruing therefrom under 35 U.S.C. §119, the content of which in its entirety is herein incorporated by reference.

BACKGROUND OF THE INVENTION

1. Field of the Invention

Exemplary embodiments of the present invention relate to a display device. More particularly, exemplary embodiments of the present invention relate to a display device having a substantially improved display quality.

2. Description of the Related Art

Generally, a liquid crystal display ("LCD") device includes an LCD panel and a driving apparatus which drives the LCD panel. The LCD panel includes data lines and gate lines crossing the data lines. The data lines and the gate lines may define pixel parts therebetween.

The driving apparatus typically includes a gate driving circuit which outputs a gate signal to the gate lines, and a data driving circuit which outputs a data signal to the data lines.

In attempts to decrease a total size and manufacturing costs of the LCD device, a pixel structure requiring a reduced number of data drive circuits has been developed. More specifically, for example, a first pixel structure includes different color pixels connected to one data line. Alternatively, a second pixel structure may include different color pixels connected to one gate line.

In the first pixel structure, a required number of the data lines is decreased by about ½, and a required number of data drive circuits is thereby also decreased by about ½. Likewise, in the second pixel structure, a gate drive circuit is disposed at a first side portion of a display panel and a data drive circuit is disposed at a second side portion of the display panel, and a required number of data drive circuits is thereby decreased.

However, in display devices including the first pixel structure and/or the second pixel structure, due to a charging time of the pixels, a kickback deviation is generated between the pixels connected to the one data line and/or the one gate line. Thus, defects such as afterimages and/or a vertical line pattern are generated on the display panel, substantially degrading a display quality thereof.

BRIEF SUMMARY OF THE INVENTION

Exemplary embodiments of the present invention provide a display device which removes a kickback voltage deviation of pixels included in a display panel of the display device.

According to an exemplary embodiment of the present invention, a display device includes a display panel, a data driving part and a gate driving part. The display panel includes a first pixel row. The first pixel row includes a first pixel connected to an (m+1)-th data line and one of an n-th gate line and an (n+1)-th gate line (where 'n' and 'm' are natural numbers), and a second pixel connected to an (m+2)-th data line and the remaining of the (n+1)-th gate line and the n-th gate line. The data driving part applies a data voltage having a first polarity with respect to a reference voltage to the (m+1)-th data line, and applies a data voltage having a second polarity with respect to the reference voltage to the (m+2)-th data line. The gate driving part sequentially applies a gate signal to the n-th gate line and the (n+1)-th gate line.

In an exemplary embodiment of the present invention, the display panel may further include a second pixel row, a third pixel row and a fourth pixel row. The second pixel row may include a third pixel connected to an (n+2)-th gate line and an m-th data line, and a fourth pixel connected to an (n+3)-th gate line and the (m+1)-th data line. The third pixel row may include a fifth pixel connected to an (n+4)-th gate line and the (m+1)-th data line, and a sixth pixel connected to an (n+5)-th gate line and the (m+2)-th data line. The fourth pixel row may include a seventh pixel connected to an (n+7)-th gate line and the m-th data line, and an eighth pixel connected to an (n+6)-th gate line and the (m+1)-th data line. The data driving part may apply the data voltage having the second polarity to the m-th data line. The gate driving part may sequentially apply the gate signal to the n-th, (n+1)-th, (n+4)-th, (n+5)-th, (n+2)-th, (n+3)-th, (n+6)-th and (n+7)-th gate lines in the above-listed order.

In an exemplary embodiment of the present invention, the data driving part inverts polarities of data voltages applied to the m-th, (m+1)-th and (m+2)-th data lines on a frame basis.

In an exemplary embodiment of the present invention, the first, third, fifth and seventh pixels are disposed symmetric to the second, fourth, sixth and eighth pixels, respectively, along the (m+1)-th data line.

In an exemplary embodiment of the present invention, the first, third, fifth and seventh pixels are disposed in a first pixel column line and display a first color, and the second, fourth, sixth and eighth pixels are disposed in a second pixel column and display a second color different from the first color.

In an alternative exemplary embodiment of the present invention, the display panel may include a second pixel row comprising a third pixel connected to an (n+3)-th gate line and an m-th data line, and a fourth pixel connected to an (n+2)-th gate line and the (m+1)-th data line, a third pixel row comprising a fifth pixel connected to an (n+4)-th gate line and (m+1)-th data and a sixth pixel connected to an (n+5)-th gate line and the (m+2)-th data line, and a fourth pixel row comprising a seventh pixel connected to an (n+6)-th gate line and the m-th data line and an eighth pixel connected to an (n+7)-th gate line and the (m+1)-th data line. The data driving part may apply the data voltage having the second polarity to the m-th data line, and the gate driving part may sequentially apply the gate signal to the n-th, (n+1)-th, (n+4)-th, (n+5)-th, (n+2)-th, (n+3)-th, (n+6)-th and (n+7)-th gate lines.

In an exemplary embodiment, the data driving part is disposed at a first side portion of the display panel, and the gate driving part is disposed at a second side portion of the display panel.

According to another alternative exemplary embodiment of the present invention, a display device includes a display panel, a data driving part and a gate driving part. The display panel includes a first pixel row. The first pixel row includes a first pixel, a second pixel, a third pixel and a fourth pixel. The first pixel is connected to an (m+1)-th data line and one of an n-th gate line and an (n+1)-th gate line. The second pixel is connected to an (m+2)-th data line and the gate line connected to the first pixel (where 'n' and 'm' are natural numbers). The third pixel is connected to the (m+2)-th data line and the remaining of the n-th gate line and the (n+1)-th gate line. The fourth pixel is connected to an (m+3)-th data line and the gate line connected to the third pixel. The data driving part applies a first data voltage having a first polarity to the (m+1)-th data line. The data driving part applies a second data voltage having a second polarity, which is substantially inverted in phase with respect to the first polarity, to the (m+2)-th data line. The data driving part applies a third data voltage having the first polarity to the (m+3)-th data line. The gate driving part sequentially applies a gate signal to the n-th gate line and the (n+1)-th gate line.

In an exemplary embodiment of the present invention, the display panel may further include a second pixel row, a third pixel row and a fourth pixel row. The second pixel row may include a fifth pixel connected to an (n+3)-th gate line and an m-th data line, a sixth pixel connected to the (n+3)-th gate line and the (m+1)-th data line, a seventh pixel connected to the (n+2)-th gate line and the (m+1)-th data line, and an eighth pixel connected to the (n+2)-th gate line and the (m+2)-th data line. The third pixel row may include a ninth pixel connected to an (n+4)-th gate line and an (m+1)-th data line, a tenth pixel connected to an (n+4)-th gate line and the (m+2)-th data line, an eleventh pixel connected to the (n+5)-th gate line and the (m+2)-th data line, and a twelfth pixel connected to the (n+5)-th gate line and the (m+3)-th data line. The fourth pixel row may include a thirteenth pixel connected to an (n+6)-th gate line and the m-th data line, a fourteenth pixel connected to the (n+6)-th gate line and the (m+1)-th data line, a fifteenth pixel connected to an (n+7)-th gate line and the (m+1)-th data line, and a sixteenth pixel connected to the (n+7)-th gate line and the (m+2)-th data line. The data driving part may apply the second data voltage having the second polarity to the m-th data line. The gate driving part may sequentially apply the gate signal to the n-th, (n+1)-th, (n+4)-th, (n+5)-th, (n+2)-th, (n+3)-th, (n+6)-th and (n+7)-th gate lines in the above-listed order.

In an exemplary embodiment of the present invention, the data driving part inverts polarities of data voltages applied to the m-th, (m+1)-th and (m+2)-th data lines on a frame basis.

In an exemplary embodiment of the present invention, the first, fifth, ninth and thirteenth pixels are disposed symmetric to the second, sixth, tenth and fourteenth pixels, respectively, about the (m+1)-th data line, and the third, seventh, eleventh and fifteenth pixels are disposed symmetric to the fourth, eighth, twelfth and sixteenth pixels, respectively, about the (m+2)-th data line.

In an exemplary embodiment of the present invention: the first, fifth, ninth and thirteenth pixels are disposed in a first pixel column and display a first color; the second, sixth, tenth and fourteenth pixels are disposed in a second pixel column and display a second color different from the first color; the third, seventh, eleventh and fifteenth pixels are disposed in a third pixel column and display a third color different from the first color and the second color; and the fourth, eighth, twelfth and sixteenth pixels are disposed in a fourth pixel column and display the first color.

In an exemplary embodiment of the present invention, the gate driving part is disposed at a first side portion of the display panel, and the data driving part is disposed at a second side portion of the display panel.

According to another alternative exemplary embodiment of the present invention, a display device includes a display panel, a data driving part and a gate driving part. The display panel includes a first pixel row and a second pixel row, a third pixel row and a fourth pixel row. The first pixel row includes a first pixel connected to an (m+1)-th data line and one of an n-th gate line and an (n+1)-th gate line (where 'n' and 'm' are natural numbers), and a second pixel connected to an (m+2)-th data line and the remaining of the n-th gate line and the (n+1)-th gate line. The second pixel row includes a third pixel connected to the (m+1)-th data line and one of an (n+2)-th gate line and an (n+3)-th gate line, and a fourth pixel connected to the (m+2)-th data line and the remaining of the (n+2)-th gate line and the (n+3)-th gate line. The third pixel row includes a fifth pixel connected to the m-th data line and one of an (n+4)-th gate line and an (n+5)-th gate line and, and a sixth pixel connected to the (m+1)-th data line and the remaining of the (n+4)-th gate line and the (n+5)-th gate line. The fourth pixel row includes a seventh pixel connected to the m-th data line and one of an (n+6)-th gate line and an (n+7)-th gate line, and an eighth pixel connected to the (m+1)-th data line and the remaining of the (n+6)-th gate line and the (n+7)-th gate line. The data driving part applies a data voltage having a first polarity with respect to a reference voltage to the (m+1)-th data line and applies a data voltage having a second polarity with respect to the reference voltage to the m-th and (m+2)-th data lines. The gate driving part sequentially applies a gate signal to the n-th, (n+1)-th, (n+4)-th, (n+5)-th, (n+2)-th, (n+3)-th, (n+6)-th and (n+7)-th gate lines in the above-listed order.

In an exemplary embodiment of the present invention, the data driving part inverts polarities of data voltages applied to the m-th, (m+1)-th and (m+2)-th data lines on a frame basis.

In an exemplary embodiment of the present invention, the first, third, fifth and seventh pixels are disposed symmetric to the second, fourth, sixth and eighth pixels, respectively, about the (m+1)-th data line.

In an exemplary embodiment of the present invention, the first, third, fifth and seventh pixels are disposed in a first pixel column and display a first color, and the second, fourth, sixth and eighth pixels are disposed in a second pixel column and display a second color different from the first color.

In an exemplary embodiment of the present invention, the data driving part is disposed at a first side portion of the display panel, and the gate driving part is disposed at a second side portion of the display panel.

In yet another alternative exemplary embodiment of the present invention, a method of manufacturing a display device includes: forming a first pixel row comprising a first pixel connected to an (n+1)-th gate line and an (m+1)-th data line, where n and m are natural numbers, and a second pixel connected to an n-th gate line and an (m+2)-th data line; forming a data driving part which applies a data voltage having a first polarity with respect to a reference voltage to the (m+1)-th data line and which applies a data voltage having a second polarity with respect to the reference voltage to the (m+2)-th data line; and forming a gate driving part which sequentially applies a gate signal to the n-th gate line and the (n+1)-th gate line.

In an exemplary embodiment of the present invention, the method further includes: forming a second pixel row comprising a third pixel connected to an (n+2)-th gate line and an m-th data line, and a fourth pixel connected to an (n+3)-th gate line and the (m+1)-th data line; forming a third pixel row comprising a fifth pixel connected to an (n+4)-th gate line and the (m+1)-th data line, and a sixth pixel connected to an (n+5)-th gate line and the (m+2)-th data line; and forming a fourth pixel row comprising a seventh pixel connected to an (n+7)-th gate line and the m-th data line, and an eighth pixel connected to an (n+6)-th gate line and the (m+1)-th data line. The data driving part applies the data voltage having the second polarity to the m-th data line, and the gate driving part sequentially applies the gate signal to the n-th, (n+1)-th, (n+4)-th, (n+5)-th, (n+2)-th, (n+3)-th, (n+6)-th and (n+7)-th gate lines.

According to exemplary embodiments of a display device, a kickback voltage deviation is removed from whole pixels disposed on a display panel, and a display quality of the display device is thereby substantially improved.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
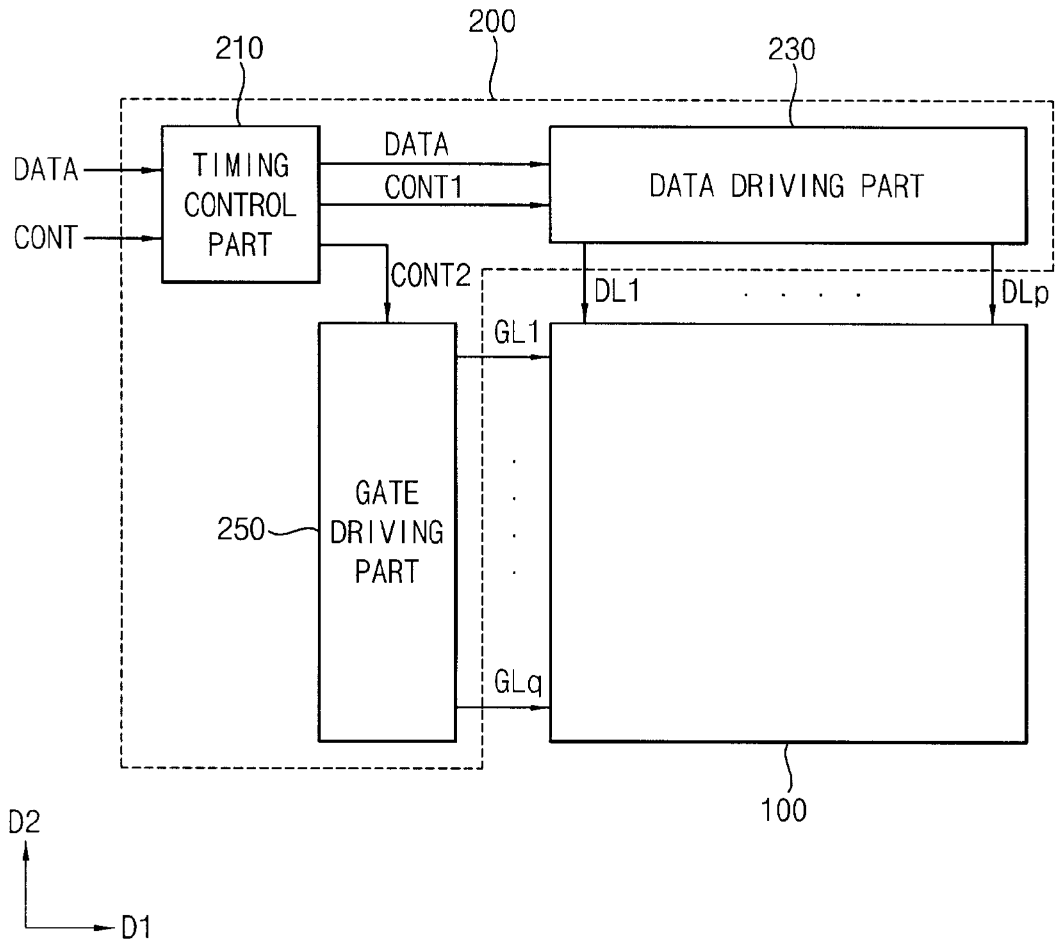
FIG. 1 is a block diagram of an exemplary embodiment of a display device according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the FIG. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the present invention will be described in further detail with reference to the accompanying drawings.

FIG. 1 is a block diagram of an exemplary embodiment of a display device according to the present invention.

Referring to FIG. 1, a display device includes a display panel 100 and a panel driving part 200 for driving the display panel 100.

The display panel 100 may have a frame shape, e.g., a substantially rectilinear shape, having a first side extending along a first direction D1 and a second side extending along a second direction D2 substantially crossing, e.g., substantially perpendicular to, the first direction D1. A plurality of gate lines GL1 to GLq and a plurality of data lines DL1 to DLp crossing the plurality of gate lines GL1 to GLq are disposed on the display panel 100. In an exemplary embodiment, 'p' and 'q' are natural numbers.

Gate lines GL1 to GLq of the plurality of gate lines GL1 to GLq extend along the first direction D1 from a first side of the display panel 100 and are arranged in rows along the second direction D2. Data lines DL1 to DLp of the plurality of data lines DL1 to DLp extend along the second direction D2 from a second side of the display panel 100 and are arranged in rows along the first direction D1.

The display panel 100 according to an exemplary embodiment includes a plurality of pixels arranged in rows along the first direction D1 and in columns along the second direction D2. Pixels of the plurality of pixels may include a red pixel, a green pixel and a blue pixel.

The panel driving part 200 includes a timing control part 210, a data driving part 230 and a gate driving part 250.

The timing control part 210 receives a data signal DATA and a control signal CONT from an external device (not shown). The control signal CONT may include a main clock signal, a vertical synchronizing signal, a horizontal synchronizing signal and a data enable signal, for example.

The timing control part 210 generates a first control signal CONT1 for controlling a driving timing of the data driving part 230 and a second control signal CONT2 for controlling a driving timing of the gate driving part 250 by using the control signal CONT. The first control signal CONT1 may include a horizontal start signal, a load signal, a data clock signal and an inversion signal, for example. The second control signal CONT2 may include a vertical start signal, a gate clock signal and an output enable signal, for example.

The data driving part 230 is disposed at the first side of the display panel 100 and outputs a data voltage to the data lines DL1 to DLp. The data driving part 230 converts a digital data signal provided from the timing control part 210 into an analog data voltage, and outputs the analog data voltage to the data lines DL1 to DLp. The data driving part 230 inverses a polarity of the data voltage in response to an inversion signal provided from the timing control part 210 and outputs data voltage the data lines DL1 to DLp.

The gate driving part 250 is disposed at the second side of the display panel 100 and sequentially outputs a gate signal to the gate lines GL1 to GLq. The gate driving part 250 generates a gate signal by using the second control signal CONT2 and gate on and gate off voltages provided from a voltage generating part (not shown). The gate signal may be a pulse signal having a pulse width of ½ H (where 'H' denotes one horizontal period).

The panel driving part 200 drives the display panel 100 in an inversion method. For example, and referring now to FIG. 2, the panel driving part 200 according to an exemplary embodiment may provide the display panel 100 with a data signal which is inverted for adjacent data lines. The display panel 100 may be driven by a 2×1 dot inversion method, in which two-dot inversion is performed in a first side direction and one-dot inversion is performed in a second side direction of the display panel 100.

Figure 2:
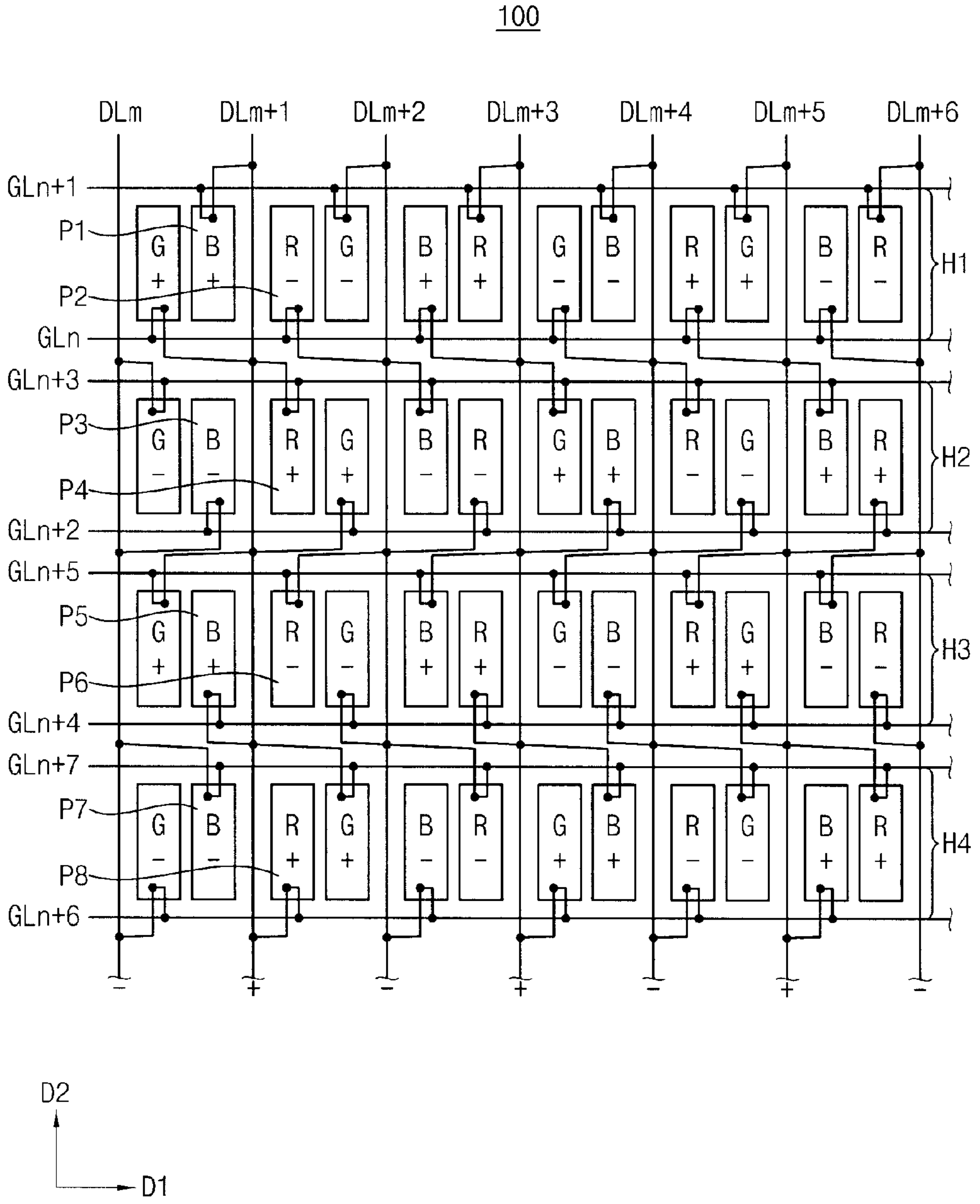
FIG. 2 is a plan view of a pixel structure of the display panel of FIG. 1.

FIG. 2 is a plan view illustrating a pixel structure of the display panel of FIG. 1.

Referring to FIG. 2, the display panel 100 includes a plurality of pixel rows arranged along the first direction D1. In an exemplary embodiment, the display panel 100 includes a first pixel row H1, a second pixel row H2, a third pixel row H3 and a fourth pixel row H4, but alternative exemplary embodiments are not limited thereto. The first pixel row H1 is disposed between an n-th gate line GLn and an (n+1)-th gate line GLn+1. In an exemplary embodiment, 'n' is a natural number. Similarly, the second pixel row H2 is disposed between an (n+2)-th gate line GLn+2 and an (n+3)-th gate line GLn+3. The third pixel row H3 is disposed between an (n+4)-th gate line GLn+4 and an (n+5)-th gate line GLn+5. The fourth pixel row H4 is disposed between an (n+6)-th gate line GLn+6 and an (n+7)-th gate line GLn+7. Two pixels are disposed in a given pixel column between two adjacent data lines, as shown in FIG. 2.

More particularly, the first pixel row H1 includes a first pixel P1 and a second pixel P2. The first pixel P1 is connected to the (n+1)-th gate line GLn+1 and an (m+1)-th data line DLm+1. In an exemplary embodiment, 'm' is a natural number. The second pixel P2 is connected to the n-th gate line GLn and an (m+2)-th data line DLm+2. In the first pixel row H1, a connection structure similar as for the first and second pixels P1 and P2, respectively, is repeated for additional pixels, and any repetitive detailed description thereof will hereinafter be omitted. The second pixel row H2 includes a third pixel P3 and a fourth pixel P4. The third pixel P3 is connected to the (n+2)-th gate line GLn+2 and an m-th data line DLm. The fourth pixel P4 is connected to the (n+3)-th gate line GLn+3 and the (m+1)-th data line DLm+1. In the second pixel row H2, a connection structure of the third and fourth pixels P3 and P4, respectively, is repeated for additional pixels therein.

The third pixel row H3 includes a fifth pixel P5 and a sixth pixel P6. The fifth pixel P5 is connected to the (n+4)-th gate line GLn+4 and the (m+1)-th data line DLm+1. The sixth pixel P6 is connected to the (n+5)-th gate line GLn+5 and the (m+2)-th data line DLm+2. In the third pixel row H3, a connection structure of the fifth and sixth pixels P5 and P6 is repeated for additional pixels in the third pixel row H3. The fourth pixel row H4 includes a seventh pixel P7 and an eighth pixel P8. The seventh pixel P7 is connected to the (n+7)-th gate line GLn+7 and the m-th data line DLm. The eighth pixel P8 is connected to the (n+6)-th gate line GLn+6 and the (m+1)-th data line DLm+1. In the fourth pixel row H4, a connection structure of the seventh and eighth pixels P7 and P8 is repeated for additional pixels therein.

The first, third, fifth and seventh pixels P1, P3, P5 and P7, respectively, may be disposed along a same line, e.g., in a first pixel column, and may display a first color. In contrast, the second, fourth, sixth and eighth pixels P2, P4, P6 and P8, respectively, may be disposed along a different same line, e.g., in a second pixel column, and may display a second color different from the first color. The first, third, fifth and seventh pixels P1, P3, P5 and P7, respectively, are disposed symmetrically to the second, fourth, sixth and eighth pixels P2, P4, P6 and P8, respectively, along the (m+1)-th data line DLm+1, as shown in FIG. 2.

Data voltages having different polarities from each other are applied to the m-th through (m+6)-th data lines DLm through DLm+6, respectively, and, more particularly, data voltages having inverted polarities may be applied to the m-th through (m+6)-th data lines DLm through DLm+6, on a frame basis, e.g., frame-by-frame. More specifically, for example, when the m-th through (m+6)-th data lines DLm through DLm+6 receive data voltages having polarities in a sequence of negative (−), positive (+), −, +, −, + and −, during a first frame, the m-th through (m+6)-th data lines DLm through DLm+6 receive data voltages having polarities in a sequence of +, −, +, −, +, − and + in a subsequent frame.

In FIG. 2, the (n+1)-th gate line GLn+1, the n-th gate line GLn, the (n+3)-th gate line GLn+3, the (n+2)-th gate line GLn+2, etc., are sequentially disposed along the second direction D2, but alternative exemplary embodiments are not limited thereto. For example, the n-th gate line GLn, the (n+1)-th gate line GLn+1, the (n+2)-th gate line GLn+2, the (n+3)-th gate line GLn+3, etc., are sequentially disposed along the second direction D2.

Figure 3:
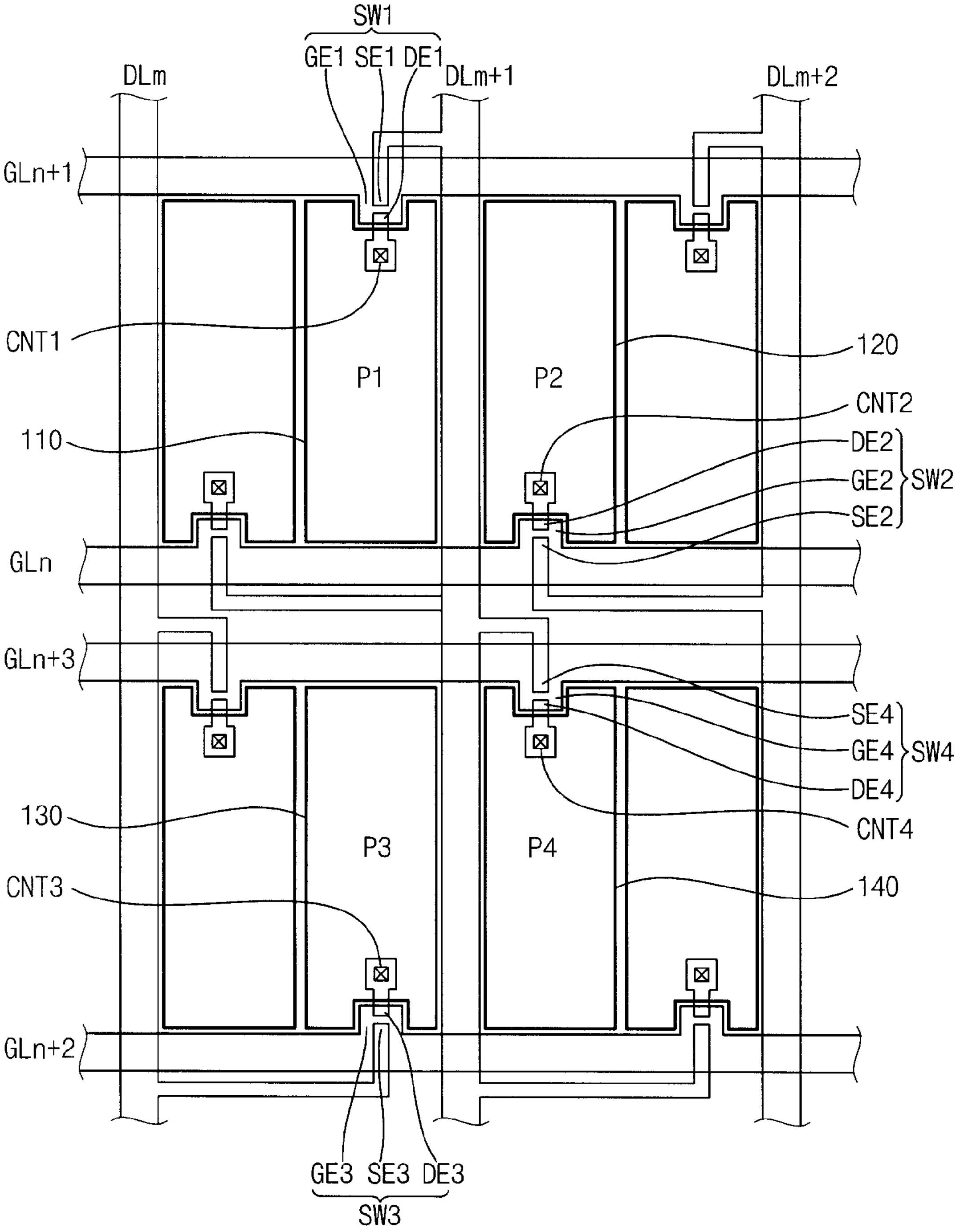
FIG. 3 is a plan view of the display panel of FIG. 1.

FIG. 3 is a plan view of the display panel of FIG. 2.

Referring to FIGS. 2 and 3, the display panel 100 according to an exemplary embodiment includes the first pixel P1, the second pixel P2, the third pixel P3 and the fourth pixel P4. In an exemplary embodiment, the first and third pixels P1 and P3, respectively, are disposed at a left side portion of the (m+1)-th data line DLm+1 (as viewed in FIG. 3), and the second and fourth pixels P2 and P4, respectively, are disposed at a right side portion (as viewed in FIG. 3) of the (m+1)-th data line DLm+1.

The first pixel P1 is disposed between the n-th and (n+1)-th gate lines GLn and GLn+1. The first pixel P1 includes a first switching element SW1 electrically connected to the (n+1)-th gate line GLn+1 and the (m+1)-th data line DLm+1, and a first pixel electrode 110 electrically connected to the first switching element SW1. The first switching element SW1 includes a first gate electrode GE1 connected to the (n+1)-th gate line GLn+1, a first source electrode SE1 connected to the (m+1)-th data line DLm+1, and a first drain electrode DE1 spaced apart from the source electrode SE1. The first pixel electrode 110 is electrically connected to the first drain electrode DE1 of the first switching element SW1 through a first contact portion CNT1.

The second pixel P2 includes a second switching element SW2 electrically connected to the n-th gate line GLn and an (m+2)-th data line DLm+2, and a second pixel electrode 120 electrically connected to the second switching element SW2. The second switching element SW2 includes a second gate electrode GE2 connected to the n-th gate line GLn, a second source electrode SE2 connected to an (m+2)-th data line DLm+2, and a second drain electrode DE2 spaced apart from the second source electrode SE2. The second pixel electrode 120 is electrically connected to the second drain electrode DE2 of the second switching element SW2 through a second contact portion CNT2.

The third pixel P3 includes a third switching element SW3 electrically connected to an (n+2)-th gate line GLn+2 and the m-th data line DLm, and a third pixel electrode 130 electrically connected to the third switching element SW3. The third switching element SW3 includes a third gate electrode GE3 connected to the (n+2)-th gate line GLn+2, a third source electrode SE3 connected to the m-th data line DLm, and a third drain electrode DE3 spaced apart from the third source electrode SE3. The third pixel electrode 130 is electrically connected to the third drain electrode DE3 of the third switching element SW3 through a third contact portion CNT3.

The fourth pixel P4 includes a fourth switching element SW4 electrically connected to an (n+3)-th gate line GLn+3 and the (m+1)-th data line DLm+1, and a fourth pixel electrode 140 electrically connected to the fourth switching element SW4. The fourth switching element SW4 includes a fourth gate electrode GE4 connected to the (n+3)-th gate line GLn+3, a fourth source electrode SE4 connected to the (m+1)-th data line DLm+1, and a fourth drain electrode DE4 spaced apart from the fourth source electrode SE4. The fourth pixel electrode 140 is electrically connected to the fourth drain electrode DE4 of the fourth switching element SW4 through a fourth contact portion CNT4.

When the n-th gate line GLn is turned on, a data voltage having a first polarity is transmitted from the (m+2)-th data line DLm+2 and is charged into the second pixel P2. When the (n+1)-th gate line GLn+1 is turned on, a data voltage having a second polarity, a phase of which is opposite to a phase of the first polarity transmitted from the (m+1)-th data line DLm+1, is charged into the first pixel P1. When the (n+2)-th gate line DLn+2 is turned on, a data voltage having the first polarity is transmitted from the m-th data line DLm and is thereby charged into the third pixel P3. When the (n+3)-th gate line GLn+3 is turned on, a data voltage having the second polarity is transmitted from the (m+1)-th data line DLm+1 and is subsequently charged into the fourth pixel P4. In an exemplary embodiment, the first polarity is a negative (−) polarity, while the second polarity is a positive (+) polarity.

Thus, in a pixel structure and an inversion driving method in accordance with an exemplary embodiment, a kickback voltage deviation of the pixels of the first pixel row H1, e.g., the first and second pixels P1 and P2, respectively, is compensated by the pixels of the third pixel row H3, e.g., the fifth and sixth pixels P5 and P6, respectively, and a kickback voltage deviation of the pixels of the second pixel row H2, e.g., the third and fourth pixels P3 and P4, respectively, is compensated by the pixels of the fourth pixel row H4, e.g., the seventh and eight pixels P7 and P8, respectively.

Figure 4:
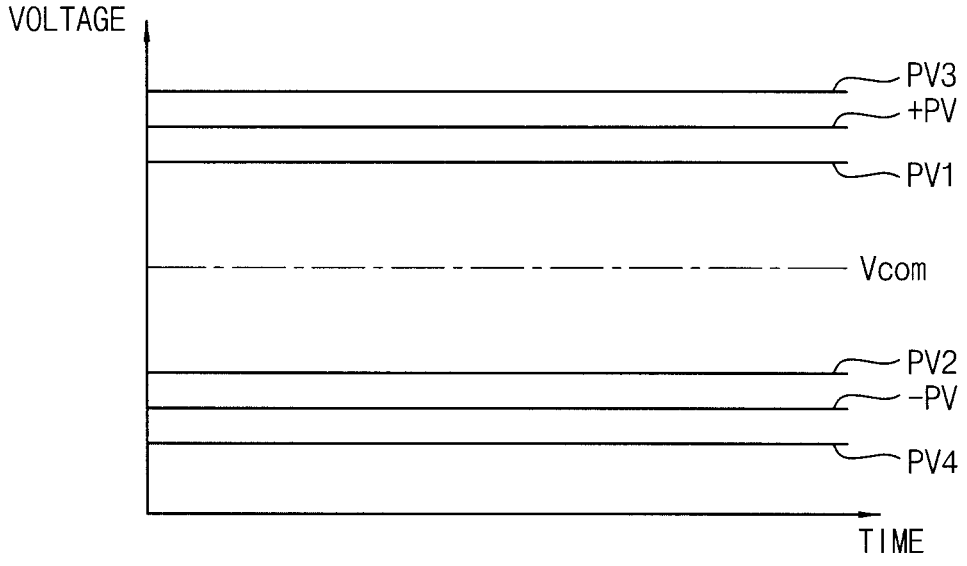
FIG. 4 is a graph of voltage versus time, and more particularly, is a signal timing diagram illustrating pixel voltages charged in pixels of the display panel FIG. 1.

FIG. 4 is a graph of voltage versus time, and more particularly, is a signal timing diagram illustrating pixel voltages charged in pixels of the display panel of FIG. 2.

Referring to FIG. 4, an exemplary embodiment in which a kickback voltage deviation is removed by a pixel structure in accordance with the present invention and an inversion driving method thereof will be described in further detail. For purposes of explanation, a principle in which a kickback voltage deviation of green pixels disposed in a first vertical pixel row, as shown in FIG. 2, will be described in further detail.

Referring to FIGS. 2 and 4, a first green (G) pixel is electrically connected to the n-th gate line GLn and the (m+1)-th data line DLm+1. When a gate signal applied to the n-th gate line GLn changes from a high level to a low level, the first green pixel may be influenced by kickback voltage due to a coupling capacitance between a gate electrode and a source electrode thereof. In addition, when a gate signal applied to the (n+1)-th gate line GLn+1 changes from a high level to a low level, the first green pixel may be influenced by kickback voltage due to a coupling capacitance between a gate line and a pixel electrode thereof.

A second green pixel is disposed between the (n+2)-th gate line GLn+2 and the (n+3)-th gate line GLn+3, and is electrically connected to the (n+3)-th gate line GLn+3 and the m-th data line DLm. When a gate signal applied to the (n+3)-th gate line GLn+3 changes from a high level to a low level, the second green pixel may be influenced only by kickback voltage due to a coupling capacitance between a gate line and a pixel electrode thereof. Thus, a first pixel voltage PV1, which is less than a positive (with respect to a common voltage Vcom) reference voltage +PV is charged into the first green pixel, and a second pixel PV2, which is greater than a negative (with respect to the common voltage Vcom) reference voltage −PV is charged into the second green pixel.

Accordingly, a third green pixel, which is disposed between the (n+4)-th gate line GLn+4 and the (n+5)-th gate line GLn+5, is connected to the (n+5)-th gate line GLn+5, which is activated temporally later than the (n+4)-th gate line GLn+4 to be influenced by a kickback voltage. However, a fourth green pixel, which is disposed between the (n+6)-th gate line GLn+6 and the (n+7)-th gate line GLn+7, is connected to the (n+6)-th gate line GLn+6, which is activated temporally before the (n+7)-th gate line GLn+7 and is thus influenced twice by kickback voltages. Thus, a third pixel voltage PV3, which is greater than the positive reference voltage +PV, is charged into the third green pixel, and a fourth pixel voltage PV4, which is less than the negative reference voltage −PV, is charged into the fourth green pixel.

When the first and third green pixels, which charge a data voltage having a positive polarity, are compared with each other, the first green pixel charges a pixel voltage PV1 less than the positive voltage +PV and the third green pixel charges a pixel voltage PV3 greater than the positive voltage +PV. An insufficient pixel voltage of the first green pixel is compensated for by the third green pixel. When the second and fourth green pixels, which charge a data voltage having a negative polarity, are compared with each other, the second green pixel charges a pixel voltage PV2 greater than the negative voltage −PV, and the fourth green pixel charges a pixel voltage PV4 less than the positive voltage +PV. An insufficient pixel voltage of the fourth green pixel is thereby compensated for by the second green pixel. As a result, a kickback voltage deviation between a red (R) pixel and a blue (B) pixel may be also compensated.

Thus, in an exemplary embodiment, kickback voltage deviations of whole red (R), green (G) and blue (B) pixels are compensated for by adjacent pixels, and display defects, such as a vertical line pattern, for example, are substantially reduced and/or are effectively prevented from being generated in a display device according to the present invention.

Figure 5:
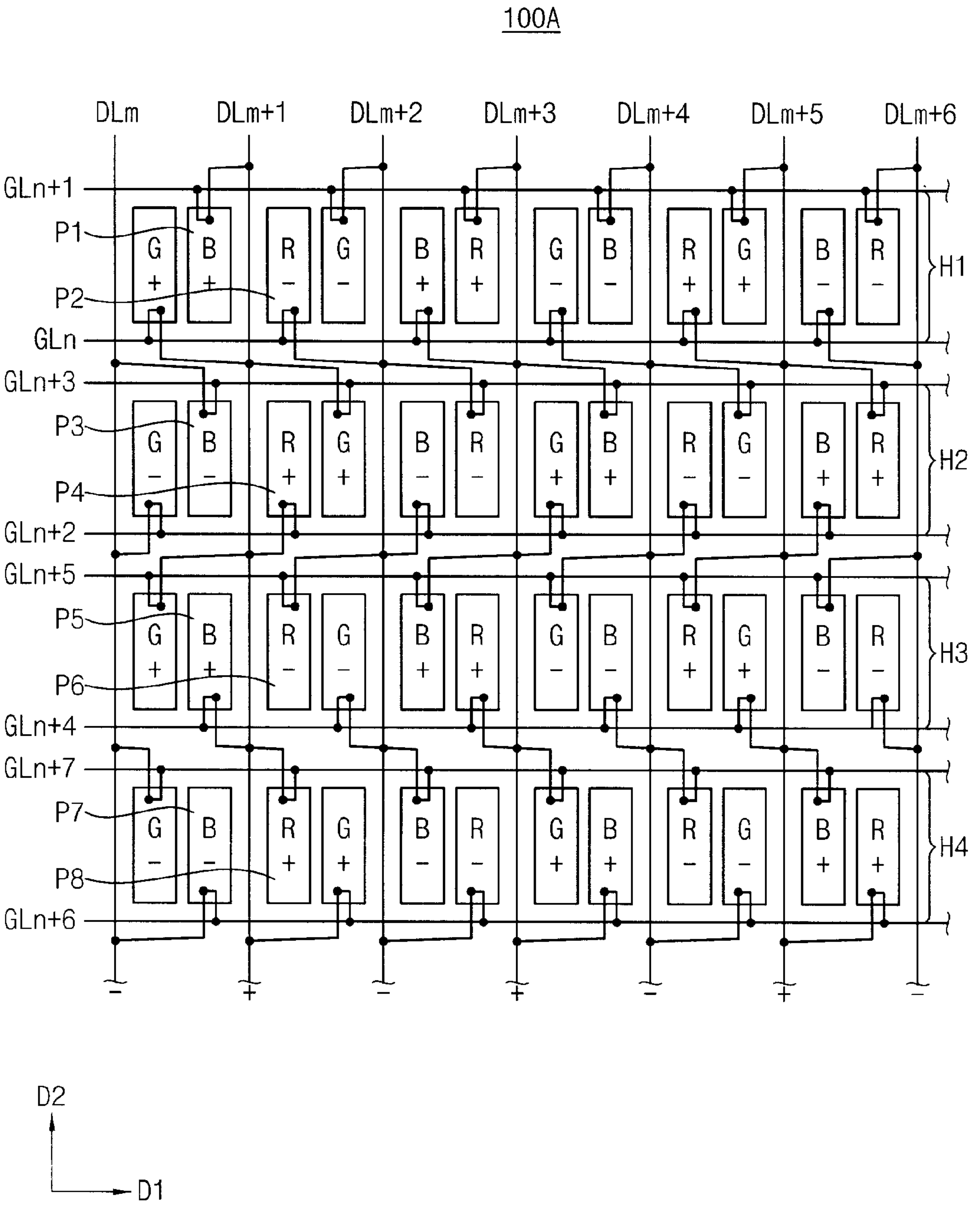
FIG. 5 is a plan view of a pixel structure of an alternative exemplary embodiment of a display panel according to the present invention.

FIG. 5 is a plan view illustrating a pixel structure of an alternative exemplary embodiment of a display panel according to the present invention.

An inversion driving method of the display panel 100A according to an alternative exemplary embodiment is substantially the same as for the display panel 100 according to the exemplary embodiments described above with reference to FIGS. 1-4; however, a connection structure between pixels and gate line is different in the alternative exemplary embodiment shown in FIG. 5, as will now be described in further detail. The same or like components shown in FIGS. 1-3 have the same reference characters in FIG. 5, and any repetitive detailed description thereof will hereinafter be omitted.

Referring to FIG. 5, gate lines GLn to GLn+7 and data lines DLm to DLm+6 crossing the gate lines GLn to GLn+7 are disposed on the display panel 100A.

The gate lines GLn to GLn+7 extended along a first direction D1 from a first side of the display panel 100A, and are disposed in rows along a second direction D2 crossing the first direction D1. The data lines DLm to DLm+6 extend along the second direction D2 from a second side of the display panel 100A, and are arranged in rows along the first direction D1.

The display panel 100A includes pixel rows arranged along in the first direction D1, and pixel columns arranged along the second direction D2. More specifically, for example, the display panel 100A includes a first pixel row H1 disposed between an n-th gate line GL and an (n+1)-th gate line GLn+1, a second pixel row H2 disposed between an (n+2)-th gate line GLn+2 and an (n+3)-th gate line GLn+3, a third pixel row H3 disposed between an (n+4)-th gate line GLn+4 and an (n+5)-th gate line GLn+5, and a fourth pixel row H4 disposed between an (n+6)-th gate line GLn+6 and an (n+7)-th gate line GLn+7.

The first pixel row H1 includes a first pixel Pb and a second pixel P2. The first pixel P1 is connected to the (n+1)-th gate line GLn+1 and an (m+1)-th data line DLm+1. In an exemplary embodiment, 'm' is a natural number. The second pixel P2 is connected to the n-th gate line GLn and an (m+2)-th data line DLm+2. In the first pixel row H1, a connection structure of the first and second pixels P1 and P2, respectively, is repeated for additional pixels in the first pixel row H1, and any repetitive detailed description thereof will hereinafter be omitted. The second pixel row H2 includes a third pixel P3 and a fourth pixel P4. The third pixel P3 is connected to the (n+3)-th gate line GLn+3 and an m-th data line DLm. The fourth pixel P4 is connected to the (n+2)-th gate line GLn+2 and the (m+1)-th data line DLm+1. In the second pixel row H2, a connection structure of the third and fourth pixels P3 and P4, respectively, is repeated for additional pixels therein.

The third pixel row H3 includes a fifth pixel P5 and a sixth pixel P6. The fifth pixel P5 is connected to the (n+4)-th gate line GLn+4 and the (m+1)-th data line DLm+1. The sixth pixel P6 is connected to the (n+5)-th gate line GLn+5 and the (m+2)-th data line DLm+2. In the third pixel row H3, a connection structure of the fifth and sixth pixels P5 and P6, respectively, is repeated for additional pixels therein. The fourth pixel row H4 includes a seventh pixel P7 and an eighth pixel P8. The seventh pixel P7 is connected to the (n+6)-th gate line GLn+6 and the m-th data line DLm. The eighth pixel P8 is connected to the (n+7)-th gate line GLn+7 and the (m+1)-th data line DLm+1. In the fourth pixel row H4, a connection structure of the seventh and eighth pixels P7 and P8, respectively, is repeated for additional pixels therein.

Data voltages having different polarities are applied to the m-th through (m+6)-th data lines DLm through DLm+6, and, more particularly, data voltages having inverted polarities may be applied to the m-th through (m+6)-th data lines DLm through DLm+6 on a frame basis, e.g., one frame-by-frame basis. More specifically, for example, when the m-th through (m+6)-th data lines DLm through DLm+6 receive data voltages having different polarities, such as in a sequence of −, +, −, +, −, + and − during a first frame, the m-th through (m+6)-th data lines DLm through DLm+6 receive data voltages having polarities in a sequence of +, −, +, −, +, − and + in a second frame. In addition, two-dot inversion is performed on the display panel 100A in a first side direction thereof in accordance with the pixel structure, and one-dot inversion is performed on the display panel 100A in a second side direction thereof. Thus, the display panel 100A may be driven using a 2×1 dot inversion method.

In an exemplary embodiment, a kickback voltage deviation of pixels of the first pixel row H1 is compensated for by the pixels of the third pixel row H3, while a kickback voltage deviation of the pixels of the second pixel row H2 is compensated for by the pixels of the fourth pixel row H4.

In FIG. 5, the (n+1)-th gate line GLn+1, the n-th gate line GLn, the (n+3)-th gate line GLn+3, the (n+2)-th gate line GLn+2, etc., are sequentially disposed along the second direction D2, but alternative exemplary embodiments are not limited thereto. For example, the n-th gate line GLn, the (n+1)-th gate line GLn+1, the (n+2)-th gate line GLn+2, the (n+3)-th gate line GLn+3, etc., are sequentially disposed along the second direction D2.

Figure 6:
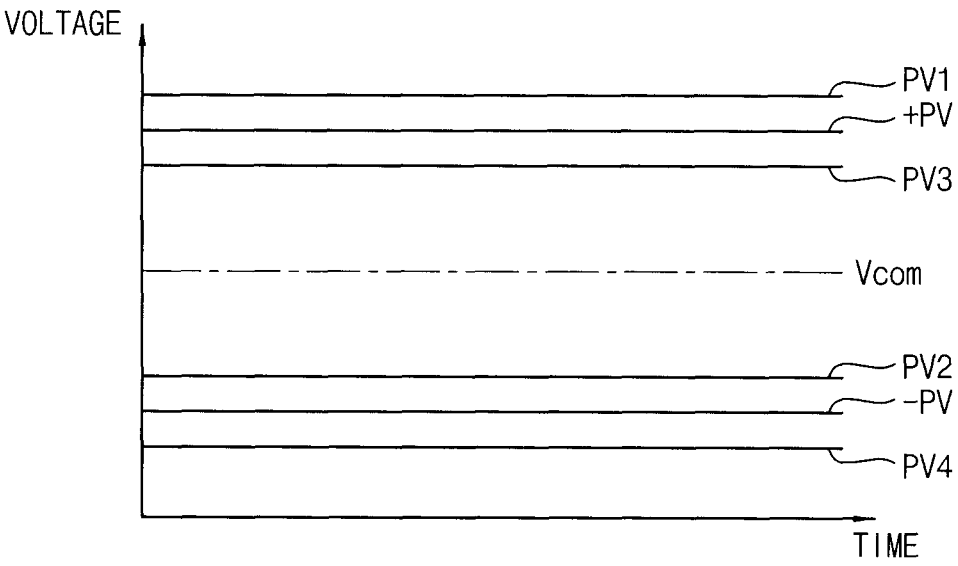
FIG. 6 is a graph of voltage versus time, and more particularly, is a signal timing diagram illustrating pixel voltages charged in pixels of the display panel of FIG. 5.

FIG. 6 is a graph of voltage versus time illustrating pixel voltages charged in pixels of the display panel of FIG. 5.

Hereinafter, an exemplary embodiment in which a kickback voltage deviation is removed by the pixel structure according to the present invention, and an inversion driving method thereof, will be described in further detail. More particularly, a principle in which a kickback voltage deviation of green (G) pixels disposed in a first vertical pixel row, as shown in FIG. 5, will be described in further detail for purposes of explanation.

Referring to FIGS. 5 and 6, a first green (G) pixel is electrically connected to the n-th gate line GLn and the (m+1)-th data line DLm+1. A second green pixel is electrically connected to the (n+2)-th gate line GLn+2 and an m-th data line DLm. A third green pixel is electrically connected to the (n+5)-th gate line GLn+5 and the (m+1)-th data line DLm+1. A fourth green pixel is electrically connected to the eighth gate line GL8 and the m-th data line DLm.

The first green pixel is connected to the n-th gate line GLn, which is activated before the (n+1)-th gate line GLn+1 and is thereby influenced two times by a kickback voltage. However, the third green pixel is connected to the (n+5)-th gate line GLn+5, which is activated temporally later than the (n+5)-th gate line GLn+5 and is therefore influenced one time by a kickback voltage. Thus, a first pixel voltage PV1 is less than a positive reference voltage +PV is and is charged into the first green pixel, and a third pixel voltage PV3 greater than the positive reference voltage +PV is charged into the third green pixel. Accordingly, an insufficient pixel voltage of the first green pixel is compensated for by a pixel voltage charged into the third green pixel.

Additionally, a second green pixel is connected to the (n+2)-th gate line GLn+2, which is activated temporally before the (n+3)-th gate line GLn+3 and is thereby influenced two times by a kickback voltage. However, the fourth green pixel is connected to the (n+7)-th gate line GLn+7, which is activated temporally later than the (n+6)-th gate line GLn+6 and is thereby influenced one time by a kickback voltage. Thus, a second pixel voltage PV2 is less than a negative reference voltage −PV and is charged into the second green pixel, while a fourth pixel voltage PV4 greater than the negative reference voltage −PV is charged into the fourth green pixel. Therefore, an insufficient pixel voltage of the second green pixel is compensated for by a pixel voltage charged into the fourth green pixel. Likewise, in an exemplary embodiment, a kickback voltage deviation between a red (R) pixel and a blue (B) pixel is also compensated.

Thus, according to an exemplary embodiment, kickback voltage deviations of whole red (R), green (G) and blue (B) pixels are compensated for by adjacent pixels, and display defects, such as a vertical line pattern, for example, are substantially reduced and/or are effectively prevented from being generated.

Figure 7:
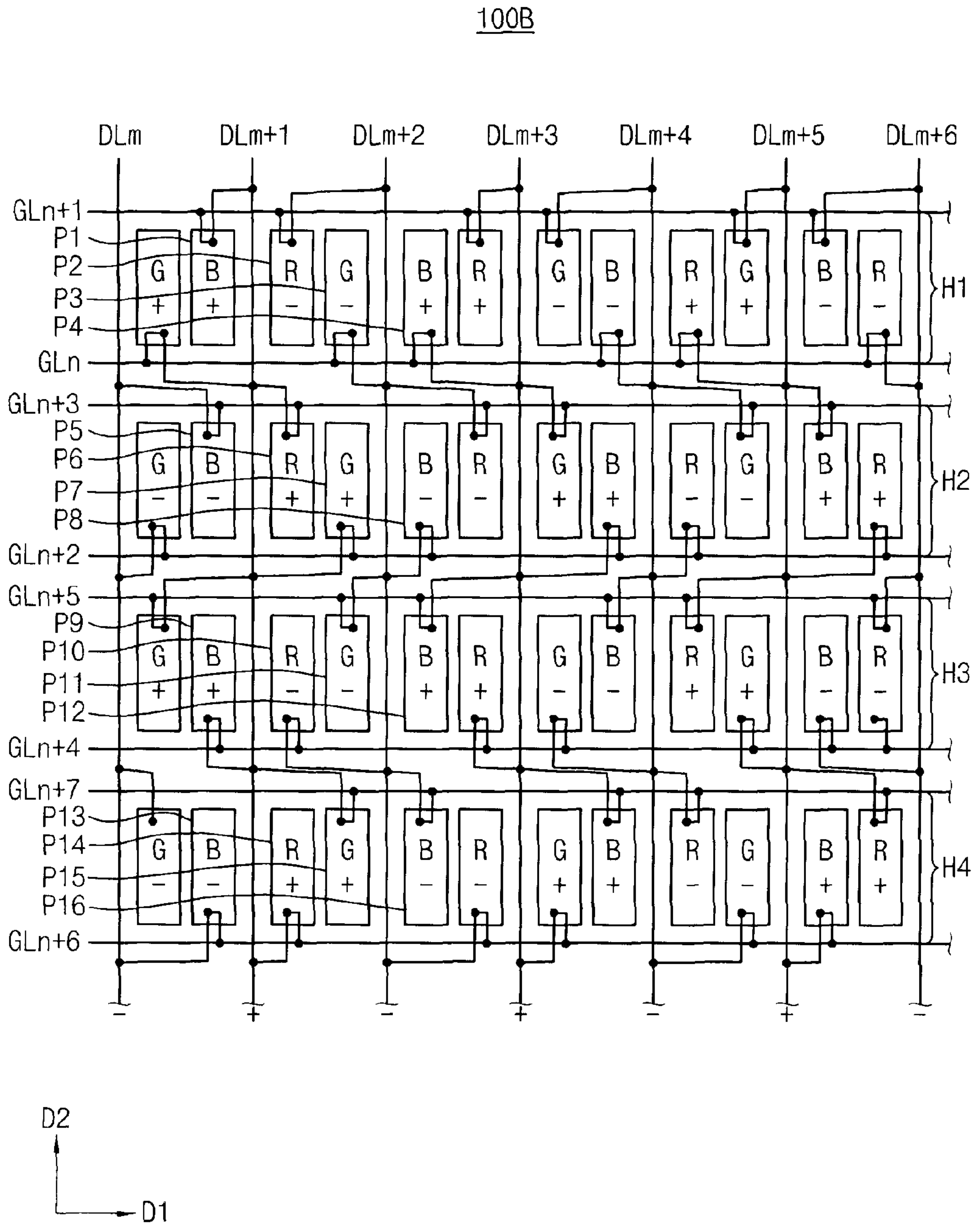
FIG. 7 is a plan view of a pixel structure of another alternative exemplary embodiment of a display panel according to the present invention.

FIG. 7 is a plan view illustrating a pixel structure of another alternative exemplary embodiment of a display panel according to the present invention.

An inversion driving method of the display panel 100B according to an alternative exemplary embodiment is substantially the same as that of the display panel 100 according to the exemplary embodiments described in greater detail above; however, a connection structure between pixels and gate lines of the exemplary embodiment shown in FIG. 7 is different from those of the exemplary embodiments described above.

Referring to FIG. 7, gate lines GLn to GLn+7 and data lines DLm to DLm+6 crossing the gate lines GLn to GLn+7 are disposed on the display panel 100B. The gate lines GLn to GLn+7 extend along a first direction D1 from a first side of the display panel 100A, and are arranged along a second direction D2 crossing the first direction D1. The data lines DLm to DLm+6 extend along the second direction D2 form a second side of the display panel 100A, and are arranged along in the first direction D1.

The display panel 100B includes pixel rows that are arranged along the first direction D1 and pixel columns that are arranged along the second direction D2. More specifically, for example, the display panel 100B according to an exemplary embodiment includes a first pixel row H1 disposed between an n-th gate line GL and an (n+1)-th gate line GLn+1, a second pixel row H2 disposed between an (n+2)-th gate line GLn+2 and an (n+3)-th gate line GLn+3, a third pixel row H3 disposed between an (n+4)-th gate line GLn+4 and an (n+5)-th gate line GLn+5, and a fourth pixel row H4 disposed between an (n+6)-th gate line GLn+6 and an (n+7)-th gate line GLn+7.

The first pixel row H1 includes a first pixel P1, a second pixel P2, a third pixel P3 and a fourth pixel P4. The first pixel Pb is connected to the (n+1)-th gate line GLn+1 and an (m+1)-th data line DLm+1. The second pixel P2 is connected to the (n+1)-th gate line GLn+1 and an (m+2)-th data line DLm+2. The third pixel P3 is connected to the n-th gate line GLn and the (m+2)-th data line DLm+2. The fourth pixel is connected to the n-th gate line GLn and a fourth data line DL4. In the first pixel row H1, a connection structure of the first through fourth pixels P1, P2, P3 and P4 is repeated for additional pixels therein.

The second pixel row H2 includes a fifth pixel P5, a sixth pixel P6, a seventh pixel P7 and an eighth pixel P8. The fifth pixel P5 is connected to the (n+3)-th gate line GLn+3 and an m-th data line DLm. The sixth pixel P6 is connected to the (n+3)-th gate line GLn+3 and the (m+1)-th data line DLm+1. The seventh pixel P7 is connected to the (n+2)-th gate line GLn+2 and the (m+1)-th data line DLm+1. The eighth pixel P8 is connected to the (n+2)-th gate line GLn+2 and the (m+2)-th data line DLm+2. In the second pixel row H2, a connection structure of the fifth through eighth pixels P5, P6, P7 and P8 is repeated for additional pixels therein.

The third pixel row H3 includes a ninth pixel P9, a tenth pixel P10, an eleventh pixel P11 and a twelfth pixel P12. The ninth pixel P9 is connected to the (n+4)-th gate line GLn+4 and the (m+1)-th data line DLm+1. The tenth pixel P10 is connected to the (n+4)-th gate line GLn+4 and the (m+2)-th data line DLm+2. The eleventh pixel P11 is connected to the (n+5)-th gate line GLn+5 and the (m+2)-th data line DLm+2. The twelfth pixel P12 is connected to the (n+5)-th gate line GLn+5 and the (m+3)-th data line DLm+3. In the third pixel row H3, a connection structure of the ninth through twelfth pixels P9, P10, P11 and P12 is repeated for additional pixels therein.

The fourth pixel row H4 includes a thirteenth pixel P13, a fourteenth pixel P14, a fifteenth pixel P15 and a sixteenth pixel P16. The thirteenth pixel P13 is connected to the (n+6)-th gate line GLn+6 and the m-th data line DLm. The fourteenth pixel P14 is connected to the (n+6)-th gate line GLn+6 and the (m+1)-th data line DLm+1. The fifteenth pixel P15 is connected to the (n+7)-th gate line GLn+7 and the (m+1)-th data line DLm+1. The sixteenth pixel P16 is connected to the (n+7)-th gate line GLn+7 and the (m+2)-th data line DLm+2. In the fourth pixel row H4, a connection structure of the thirteenth through sixteenth pixels P13, P14, P15 and P16 is repeated for additional pixels therein.

The first, fifth, ninth and thirteenth pixels P1, P5, P9 and P13, respectively, may be disposed along a same line, e.g., in a first pixel column, and may display a first color, while the second, sixth, tenth and fourteenth pixels P2, P6, P10 and P14, respectively, may be disposed on a different line, e.g., in a second pixel column, to display a second color different from the first color. The third, seventh, eleventh and fifteenth pixels P3, P7, P11 and P15, respectively, may be disposed on a different line, e.g., in a third pixel column, to display a third color different from the second color and the first color, and the fourth, eighth, twelfth and sixteenth pixels P4, P8, P12 and P16, respectively, may be disposed on another same line, e.g., in a fourth pixel column, to display the first color. In an exemplary embodiment, the first color may be a blue (B) color, the second color may be a red (R) color and the third color may be a green (G) color.

The first, fifth, ninth and thirteenth pixels P1, P5, P9 and P13, respectively, are disposed symmetrically to the second, sixth, tenth and fourteenth pixels P2, P6, P10 and P14, respectively, along the (m+1)-th data line DLm+1. Also, the third, seventh, eleventh and fifteenth pixels P3, P7, P11 and P15, respectively, are disposed symmetrically to the fourth, eighth, twelfth and sixteenth pixels P4, P8, P12 and P16, respectively, along the (m+2)-th data line DLm+2.

Data voltages having different polarities are applied to the m-th through (m+6)-th data lines DLm through DLm+6, and, more particularly, data voltages having inverted polarities may be applied to the m-th through (m+6)-th data lines DLm to through +6 on a frame-by-frame basis. For example, in an exemplary embodiment, when the m-th through (m+6)-th data lines DLm through DLm+6 receive data voltages having different polarities such as in a sequence of −, +, −, +, −, + and − during a first frame, the m-th through (m+6)-th data lines DLm through DLm+6 receive data voltages having different polarities, such as in a sequence of +, −, +, −, +, − and + in a second frame. Two-dot inversion is performed on the display panel 100B in a first side direction thereof in accordance with the pixel structure, and one-dot inversion is performed on the display panel 100B in a second side direction thereof. Thus, the display panel 100B according to an exemplary embodiment may be driven using a 2×1 dot inversion method.

In an exemplary embodiment and the inversion method, a kickback voltage deviation of pixels of the first pixel row H1 is compensated for by the pixels of the third pixel row H3, and a kickback voltage deviation of the pixels of the second pixel row H2 is compensated for by the pixels of the fourth pixel row H4.

In FIG. 7, the (n+1)-th gate line GLn+1, the n-th gate line GLn, the (n+3)-th gate line GLn+3, the (n+2)-th gate line GLn+2, etc., are sequentially disposed along the second direction D2, but alternative exemplary embodiments are not limited thereto. For example, the n-th gate line GLn, the (n+1)-th gate line GLn+1, the (n+2)-th gate line GLn+2, the (n+3)-th gate line GLn+3, etc., are sequentially disposed along the second direction D2.

Figure 8:
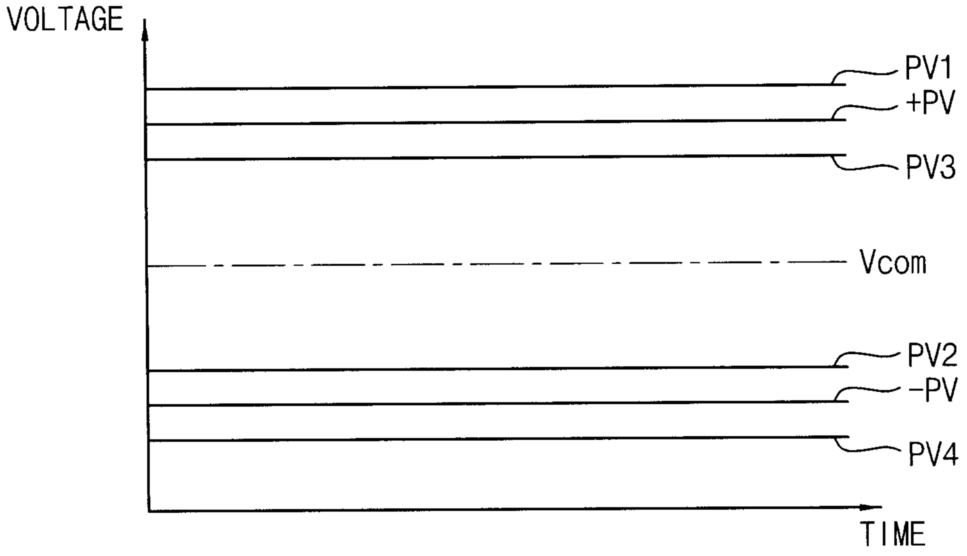
FIG. 8 is a graph of voltage versus time, and more particularly, is a signal timing diagram illustrating pixel voltages charged in pixels of the display panel of FIG. 7.

FIG. 8 is a graph of voltage versus time, and more particularly, is a signal timing diagram illustrating pixel voltages charged in pixels of the display panel of FIG. 7.

An exemplary embodiment in which a kickback voltage deviation is removed by the pixel structure according to the present invention and an inversion driving method will now be described in further detail. For purposes of explanation, principle in which a kickback voltage deviation of blue (B) pixels disposed in a second vertical pixel row, as shown in FIG. 7, will be described in further detail.

Referring to FIGS. 7 and 8, a first blue (B) pixel is connected to the (n+1)-th gate line GLn+1, which is activated temporally later than the n-th gate line GLn and is therefore influenced one time by a kickback voltage. However, a third blue pixel is connected to the (n+4)-th gate line GLn+4, which is activated temporally before the (n+5)-th gate line GLn+5 and is therefore influenced two times by a kickback voltage. Thus, a first pixel voltage PV1 greater than a positive reference voltage +PV is charged into the first blue pixel, and a third pixel voltage PV3 less than the positive reference voltage +PV is charged into the third blue pixel. As a result, an insufficient pixel voltage of the first blue pixel is compensated for by a pixel voltage charged in the third blue pixel.

In addition, a second blue pixel is connected to the (n+3)-th gate line GLn+3, which is activated temporally later than the (n+2)-th gate line GLn+2 to be influenced one time by a kickback voltage. However, the fourth blue pixel is connected to the (n+6)-th gate line GLn+6, activated before the (n+7)-th gate line GLn+7, to be influenced two times by a kickback voltage. Thus, a second pixel voltage PV2 greater than a negative reference voltage −PV is charged into the second blue pixel, and a fourth pixel voltage PV4 less than the negative reference voltage −PV is charged into the fourth blue pixel. Therefore, an insufficient pixel voltage of the second blue pixel is compensated for by a pixel voltage charged in the fourth blue pixel. Similarly, a kickback voltage deviation between red (R) pixel and green (G) pixel may be also compensated.

According to an exemplary embodiment, kickback voltage deviations of whole red (R), green (G) and blue (B) pixels are compensated for by adjacent pixels, and display defects such as a vertical line pattern are substantially reduced and/or are effectively prevented from being generated.

Figure 9:
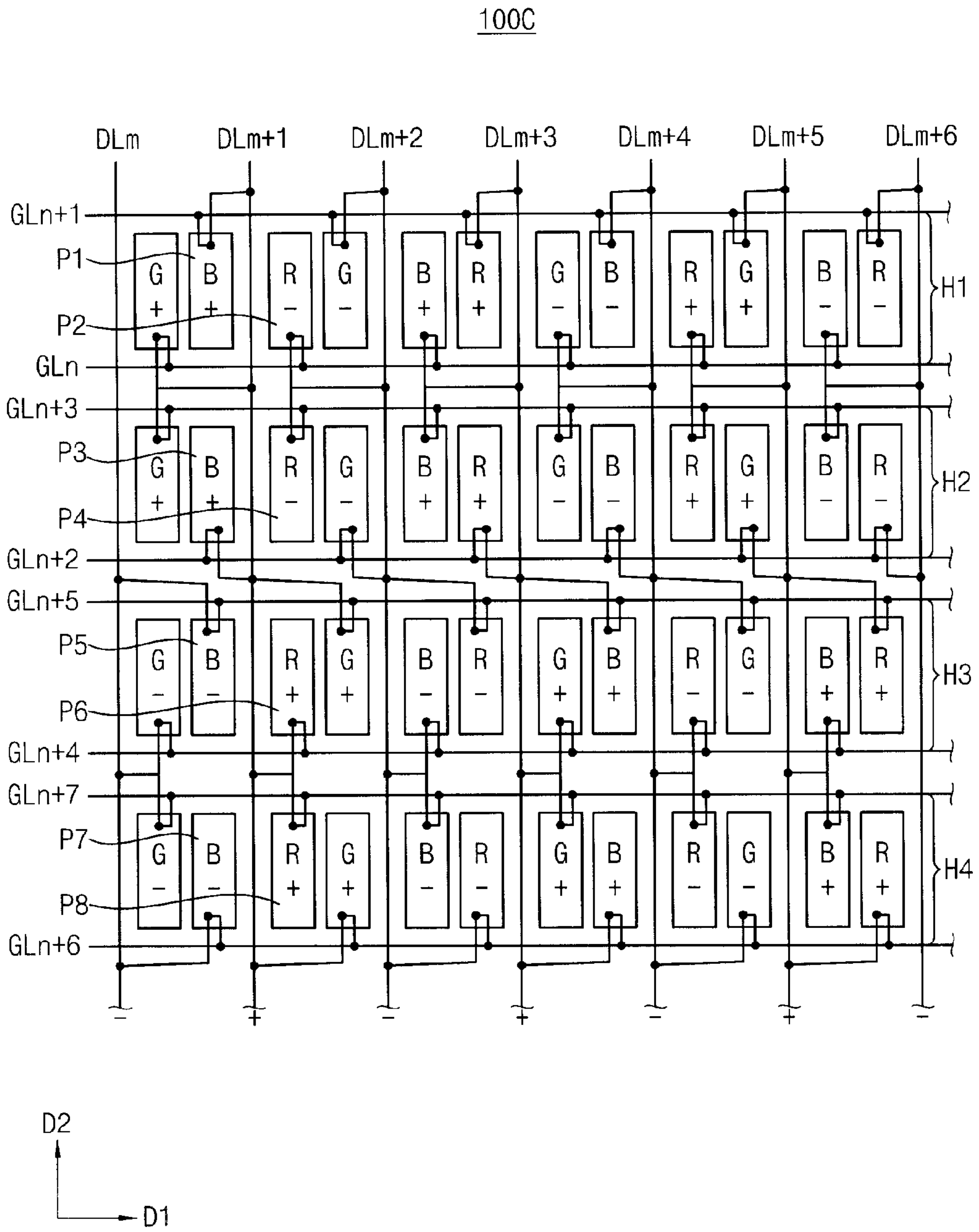
FIG. 9 is a plan view of a pixel structure of yet another alternative exemplary embodiment of display panel according to the present invention.

FIG. 9 is a plan view illustrating a pixel structure of yet another alternative exemplary embodiment of a display panel according to the present invention.

Referring to FIG. 9, gate lines GLn to GLn+7 and data lines DLm to DLm+6 crossing the gate lines GLn to GLn+7 are disposed on a display panel 100C.

The gate lines GLn to GLn+7 extend along a first direction D1 form a first side of the first panel 100C, and are arranged along a second direction D2 crossing the first direction D1. The data lines DLm to DLm+6 extend along the second direction D2 from a second side of the display panel 100C, and are arranged along the first direction D1.

The display panel 100C includes pixel rows arranged along the first direction D1 and pixel columns arranged along the second direction D2. More specifically, for example, the display panel 100C according to an exemplary embodiment includes a first pixel H1 disposed between an n-th gate line GLn and an (n+1)-th gate line GLn+1, a second pixel H2 disposed between an (n+2)-th gate line GLn+2 and an (n+3)-th gate line GLn+3, a third pixel H3 disposed between an (n+4)-th gate line GLn+4 and an (n+5)-th gate line GLn+5, and a fourth pixel H4 disposed between an (n+6)-th gate line GLn+6 and an (n+7)-th gate line GLn+7.

The first pixel row H1 includes a first pixel P1 connected to the (n+1)-th gate line GLn+1 and an (m+1)-th data line DLm+1, and a second pixel P2 connected to the n-th gate line GLn and an (m+2)-th data line DLm+2. In the first pixel row H1, a connection structure of the first and second pixels P1 and P2, respectively, is repeated for additional pixels therein. The second pixel row H2 includes a third pixel P3 connected to the (n+2)-th gate line GLn+2 and an (m+1)-th data line DLm+1, and a fourth pixel P4 connected to the (n+3)-th gate line GLn+3 and an (m+2)-th data line DLm+2. In the second pixel row H2, a connection structure of the third and fourth pixels P3 and P4, respectively, is repeated for additional pixels therein.

The third pixel row H3 includes a fifth pixel P5 connected to the (n+5)-th gate line GLn+5 and the m-th data line DLm, and a sixth pixel P6 connected to the (n+4)-th gate line GLn+4 and the (m+1)-th data line DLm+1. In the third pixel row H3, a connection structure of the fifth and sixth pixels P5 and P6 is repeated. The fourth pixel row H4 includes a seventh pixel P7 connected to the (n+6)-th gate line GLn+6 and the m-th data line DLm, and an eighth pixel P8 connected to the (n+7)-th gate line GLn+7 and the (m+1)-th data line DLm+1. In the fourth pixel row H4, a connection structure of the seventh and eighth pixels P7 and P8, respectively, is repeated for additional pixels therein.

Data voltages having different polarities are applied to the m-th through (m+6)-th data lines DLm through DLm+6, and, more specifically, data voltages having inverted polarities may be applied to the m-th through (m+6)-th data lines DLm through DLm+6 on a frame basis. More particularly, when the m-th through (m+6)-th data lines DLm through DLm+6 receive data voltages having different polarities such as in a sequence of −, +, −, +, −, + and − during a first frame, the m-th through (m+6)-th data lines DLm through DLm+6 receive data voltages having different polarities, such as in a sequence of +, −, +, −, +, − and +during a second frame. Two-dot inversion is performed on the display panel 100C in a first side direction thereof in accordance with the pixel structure, and two-dot inversion is performed on the display panel 100C in a second side direction thereof. Thus, the display panel 100C may be driven using a 2×2 dot inversion method.

Due to the pixel structure according an exemplary embodiment and the inversion method, a kickback voltage deviation of pixels of the first pixel row H1 is compensated for by the pixels of the third pixel row H3, and a kickback voltage deviation of the pixels of the second pixel row H2 is compensated for by the pixels of the fourth pixel row H4.

In FIG. 9, the (n+1)-th gate line GLn+1, the n-th gate line GLn, the (n+3)-th gate line GLn+3, the (n+2)-th gate line GLn+2, etc., are sequentially disposed along the second direction D2, but alternative exemplary embodiments are not limited thereto. For example, the n-th gate line GLn, the (n+1)-th gate line GLn+1, the (n+2)-th gate line GLn+2, the (n+3)-th gate line GLn+3, etc., are sequentially disposed along the second direction D2.

Figure 10:
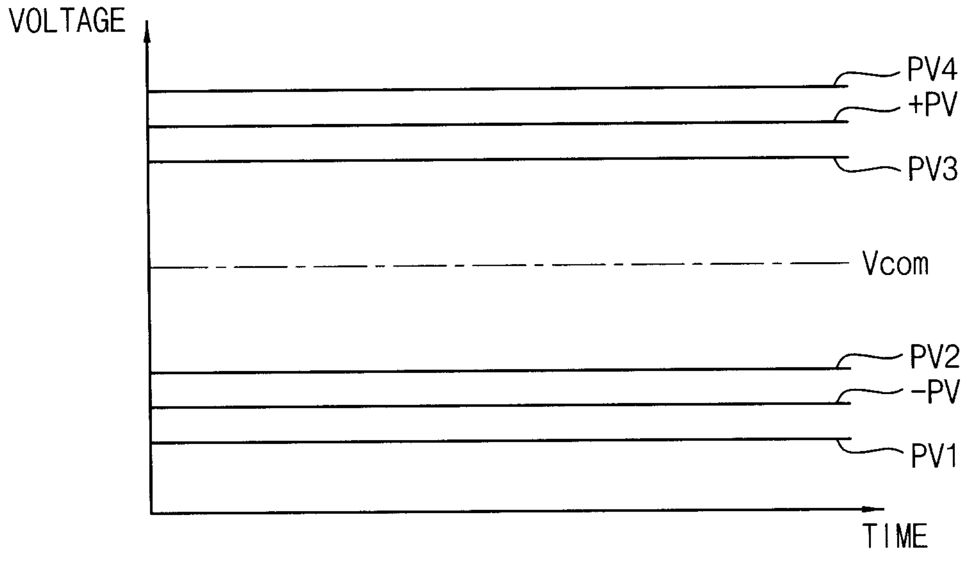
FIG. 10 is a graph of voltage versus time, and more particularly, is a signal timing diagram illustrating pixel voltages charged in pixels of the display panel of FIG. 9.

FIG. 10 is a graph of voltage virus time, and more particularly, is a signal timing diagram illustrating pixel voltages charged in pixels of the display panel of FIG. 9.

A principle in which a kickback voltage deviation is removed due to the pixel structure according to an exemplary embodiment and an inversion driving method will now be described in further detail. Moreover, for purposes of explanation, a principle in which a kickback voltage deviation of red (R) pixels disposed in a third vertical pixel row, as shown in FIG. 9, will be described in further detail.

Referring to FIGS. 9 and 10, a first red (R) pixel is connected to the n-th gate line GLn+1 activated temporally before the (n+1)-th gate line GLn+1 and therefore influenced two times by a kickback voltage. However, a second red pixel is connected to the (n+3)-th gate line GLn+3 activated temporally later than the (n+2)-th gate line GLn+2 to be influenced one time by a kickback voltage. Thus, a first pixel voltage PV1 less than a negative reference voltage −PV is charged into the first red pixel, and a second pixel voltage PV2 greater than the positive reference voltage +PV is charged into the second red pixel. Thus, an insufficient pixel voltage of the first red pixel is compensated for by a pixel voltage charged into the second red pixel.

Additionally, a third red pixel is connected to the (n+2)-th gate line GLn+2 activated temporally before the (n+3)-th gate line GLn+3 to be influenced two times by a kickback voltage. However, the fourth red pixel is connected to the (n+7)-th gate line GLn+7 activated temporally later than the (n+6)-th gate line GLn+6 to be influenced one time by a kickback voltages. Thus, a third pixel voltage PV3 less than a positive reference voltage +PV is charged into the third red pixel, and a fourth pixel voltage PV4 greater than the positive reference voltage +PV is charged into the fourth red pixel. Therefore, an insufficient pixel voltage of the third red pixel is compensated for by a pixel voltage charged in the fourth red pixel. Similarly, a kickback voltage deviation between a green (G) pixel and a blue (B) pixel may be also compensated.

Thus, according to an exemplary embodiment, kickback voltage deviations of whole red (R), green (G) and blue (B) pixels are compensated for by adjacent pixels, and display defects such as a vertical line pattern are substantially reduced and/or are effectively prevented from being generated.

As described herein, in exemplary embodiments of the present invention, a kickback voltage deviation is effectively removed from whole pixels, and display defects, such as a vertical line pattern, for example, are effectively prevented from being generated due to the kickback voltage deviation. Therefore, a display quality of a display device according to an exemplary embodiment is substantially enhanced.

The present invention should not be construed as being limited to the exemplary embodiments set forth herein. Rather, these exemplary embodiments are provided so that this disclosure will be thorough and complete and will fully convey the concept of the present invention to those skilled in the art.

For example, in still another alternative exemplary embodiment, a method of manufacturing a display device includes: forming a first pixel row comprising a first pixel connected to an (n+1)-th gate line and an (m+1)-th data line, where n and m are natural numbers, and a second pixel connected to an n-th gate line and an (m+2)-th data line; forming a data driving part which applies a data voltage having a first polarity to the (m+1)-th data line and which applies a data voltage having a second polarity, which is substantially inverted in phase with respect to the first polarity, to the (m+2)-th data line; and forming a gate driving part which sequentially applies a gate signal to the n-th gate line and the (n+1)-th gate line. The method may further include: forming a second pixel row comprising a third pixel connected to an (n+2)-th gate line and an m-th data line, and a fourth pixel connected to an (n+3)-th gate line and the (m+1)-th data line; forming a third pixel row comprising a fifth pixel connected to an (n+4)-th gate line and the (m+1)-th data line, and a sixth pixel connected to an (n+5)-th gate line and the (m+2)-th data line; and forming a fourth pixel row comprising a seventh pixel connected to an (n+7)-th gate line and the m-th data line, and an eighth pixel connected to an (n+6)-th gate line and the (m+1)-th data line. The data driving part applies the data voltage having the second polarity to the m-th data line, and the gate driving part sequentially applies the gate signal to the n-th, (n+1)-th, (n+4)-th, (n+5)-th, (n+2)-th, (n+3)-th, (n+6)-th and (n+7)-th gate lines.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A display device comprising:

a display panel comprising:

- a first pixel row comprising a first pixel connected to an (m+1)-th data line and one of an n-th gate line and an (n+1)-th gate line, where n and m are natural numbers, and a second pixel connected to an (m+2)-th data line and the remaining of the (n+1)-th gate line and the n-th gate line;
- a second pixel row comprising a third pixel connected to an (n+2)-th gate line and an m-th data line, and a fourth pixel connected to an (n+3)-th gate line and the (m+1)-th data line;
- a third pixel row comprising a fifth pixel connected to an (n+4)-th gate line and the (m+1)-th data line, and a sixth pixel connected to an (n+5)-th gate line and the (m+2)-th data line; and
- a fourth pixel row comprising a seventh pixel connected to an (n+7)-th gate line and the m-th data line, and an eighth pixel connected to an (n+6)-th gate line and the (m+11)-th data line;

a data driving part which applies a data voltage having a first polarity with respect to a reference voltage to the (m+1)-th data line and which applies a data voltage having a second polarity with respect to the reference voltage to the (m+2)-th and m-th data lines; and a gate driving part which sequentially applies a gate signal to the n-th, (n+1)-th, (n+4)-th, (n+5)-th, (n+2)-th, (n+3)-th, (n+6)-th and (n+7)-th gate lines in the above-listed order.

2. The display device of claim 1, wherein the data driving part inverts polarities of data voltages applied to the m-th, (m+1)-th and (m+2)-th data lines on a frame basis.

3. The display device of claim 1, wherein the first, third, fifth and seventh pixels are disposed symmetric to the second, fourth, sixth and eighth pixels, respectively, along the (m+1)-th data line.

4. The display device of claim 1, wherein the first, third, fifth and seventh pixels are disposed in a first pixel column line and display a first color, and the second, fourth, sixth and eighth pixels are disposed in a second pixel column and display a second color different from the first color.

5. A display device comprising:

a display panel comprising:

a first pixel row comprising a first pixel connected to an (m+1)-th data line and one of an n-th gate line and an (n+1)-th gate line, where n and m are natural numbers, and a second pixel connected to an (m+2)-th data line and the remaining of the (n+1)-th gate line and the n-th gate-line;

a second pixel row comprising a third pixel connected to an (n+3)-th gate line and an m-th data line, and a fourth pixel connected to an (n+2)-th gate line and the (m+1)-th data line;

a third pixel row comprising a fifth pixel connected to an (n+4)-th gate line and (m+1)-th data and a sixth pixel connected to an (n+5)-th gate line and the (m+2)-th data line; and a fourth pixel row comprising a seventh pixel connected to an (n+6)-th gate line and the m-th data line and an eighth pixel connected to an (n+7)-th gate line and the (m+1)-th data line;

the a data driving part which applies a data voltage having a first polarity with respect to a reference voltage to the (m+1)-th data line and which applies a data voltage having a second polarity with respect to the reference voltage to the m-th and (m+2)-th data lines; and the a gate driving part which sequentially applies a gate signal to the n-th, (n+1)-th, (n+4)-th, (n+5)-th, (n+2)-th, (n+3)-th, (n+6)-th and (n+7)-th gate lines in the above-listed order.

6. The display device of claim 5, wherein the data driving part is disposed at a first side portion of the display panel, and the gate driving part is disposed at a second side portion of the display panel.

7. A display device comprising:

a display panel comprising:

a first pixel row comprising a first pixel connected to an (m+1)-th data line and one of an n-th gate line and an (n+1)-th gate line, a second pixel connected to an (m+2)-th data line and the gate line connected to the first pixel, where n and m are natural numbers, a third pixel connected to the (m+2)-th data line and the remaining of the n-th gate line and the (n+1)-th gate line, and a fourth pixel connected to an (m+3)-th data line and the gate line connected to the third pixel;

a second pixel row comprising a fifth pixel connected to an (n+3)-th gate line and an m-th data line, a sixth pixel connected to the (n+3)-th gate line and the (m+1)-th data line, a seventh pixel connected to an (n+2)-th gate line and the (m+1)-th data line, and an eighth pixel connected to the (n+2)-th gate line and the (m+2)-th data line;

a third pixel row comprising a ninth pixel connected to an (n+4)-th gate line and an (m+1)-th data line, a tenth pixel connected to an (n+4)-th gate line and the (m+2)-th data line, an eleventh pixel connected to the (n+5)-th gate line and the (m+2)-th data line, and a twelfth pixel connected to the (n+5)-th gate line and the (m+3)-th data line; and a fourth pixel row comprising a thirteenth pixel connected to an (n+6)-th gate line and the m-th data line, a fourteenth pixel connected to the (n+6)-th gate line and the (m+1)-th data line, a fifteenth pixel connected to an (n+7)-th gate line and the (m+1)-th data line, and a sixteenth pixel connected to the (n7)-th gate line and the (m+2)-th data line;

a data driving part which applies a first data voltage having a first polarity with respect to a reference voltage to the (m+1)-th data line, applies a second data voltage having a second polarity with respect to the reference voltage to the (m+2)-th and m-th data lines, and applies a third data voltage having the first polarity to the (m+3)-th data line; and a gate driving part which sequentially applies a gate signal to the n-th, (n+1)-th, (n+4-th, (n+5)-th, (n+2)-th, (n+3)-th, (n+6)-th and (n+7)-th gate lines in the above-listed order.

8. The display device of claim 7, wherein the data driving part inverts polarities of data voltages applied to the m-th, (m+1)-th and (m+2)-th data lines on a frame basis.

9. The display device of claim 8, wherein the first, fifth, ninth and thirteenth pixels are disposed symmetric to the second, sixth, tenth and fourteenth pixels, respectively, about the (m+1)-th data line, and the third, seventh, eleventh and fifteenth pixels are disposed symmetric to the fourth, eighth, twelfth and sixteenth pixels, respectively, about the (m+2)-th data line.

10. The display device of claim 8, wherein the first, fifth, ninth and thirteenth pixels are disposed in a first pixel column and display a first color, the second, sixth, tenth and fourteenth pixels are disposed in a second pixel column and display a second color different from the first color, the third, seventh, eleventh and fifteenth pixels are disposed in a third pixel column and display a third color different from the first color and the second color, and the fourth, eighth, twelfth and sixteenth pixels are disposed in a fourth pixel column and display the first color.

11. The display device of claim 10, wherein the gate driving part is disposed at a first side portion of the display panel, and the data driving part is disposed at a second side portion of the display panel.

12. A display device comprising:

a display panel comprising:

a first pixel row comprising a first pixel connected to an (m+1)-th data line and one of an n-th gate line and an (n+1)-th gate line ('n' and 'm' are natural numbers), and a second pixel connected to an (m+2)-th data line and the remaining of the n-th gate line and the (n+1)-th gate line;

a second pixel row comprising a third pixel connected to the (m+1)-th data line and one of an (n+2)-th gate line and an (n+3)-th gate line, and a fourth pixel connected to the (m+2)-th data line and the remaining of the (n+2)-th gate line and the (n+3)-th gate line;

a third pixel row comprising a fifth pixel connected to the m-th data line and one of an (n+4)-th gate line and an (n+5)-th gate line and, and a sixth pixel connected to the (m+1)-th data line and the remaining of the (n+4)-th gate line and the (n+5)-th gate line; and a fourth pixel row comprising a seventh pixel connected to the m-th data line and one of an (n+6)-th gate line and an (n+7)-th gate line, and an eighth pixel connected to the (m+1)-th data line and the remaining of the (n+6)-th gate line and the (n+7)-th gate line;

a data driving part which applies a data voltage having a first polarity with respect to a reference voltage to the (m+1)-th data line and applies a data voltage having a second polarity with respect to the reference voltage to the m-th and (m+2)-th data lines; and a gate driving part which sequentially applies a gate signal to the n-th, (n+1)-th, (n+4)-th, (n+5)-th, (n+2)-th, (n+3)-th, (n+6)-th and (n+7)-th gate lines in the above-listed order.

13. The display device of claim 12, wherein the data driving part inverts polarities of data voltages applied to the m-th, (m+1)-th and (m+2)-th data lines on a frame basis.

14. The display device of claim 13, wherein the first, third, fifth and seventh pixels are disposed symmetric to the second, fourth, sixth and eighth pixels, respectively, about the (m+1)-th data line.

15. The display device of claim 13, wherein the first, third, fifth and seventh pixels are disposed in a first pixel column and display a first color, and the second, fourth, sixth and eighth pixels are disposed in a second pixel column and display a second color different from the first color.

16. The display device of claim 15, wherein the data driving part is disposed at a first side portion of the display panel, and the gate driving part is disposed at a second side portion of the display panel.

17. A method of manufacturing a display device, the method comprising:

forming a first pixel row comprising a first pixel connected to an (m+1)-th data line and one of an n-th gate line and an (n+1)-th gate line, where n and m are natural numbers, and a second pixel connected to an (m+2)-th data line and the remaining of the n-th gate line and the (n+1)-th gate line;

forming a second pixel row comprising a third pixel connected to an (n+2)-th gate line and an m-th data line, and a fourth pixel connected to an (n+3)-th gate line and the (m+1)-th data line;

forming a third pixel row comprising a fifth pixel connected to an (n+4)-th gate line and the (m+1)-th data line, and a sixth pixel connected to an (n+5)-th gate line and the (m+2)-th data line;

forming a fourth pixel row comprising a seventh pixel connected to an (n+7)-th gate line and the m-th data line, and an eighth pixel connected to an (n+6)-th gate line and the (m+1)-th data line;

forming a data driving part which applies a data voltage having a first polarity with respect to a reference voltage to the (m+1)-th data line and which applies a data voltage having a second polarity with respect to the reference voltage to the (m+2)-th and m-th data lines; and forming a gate driving part which sequentially applies a gate signal to the n-th, (n+1)-th, (n+4)-th, (n+5)-th, (n+2)-th, (n+3)-th, (n+6-th and (n+7)-th gate lines in the above-listed order.

* * * * *